April 2, 1935.   H. M. STOLLER   1,996,495
VOLTAGE REGULATOR
Filed May 26, 1934
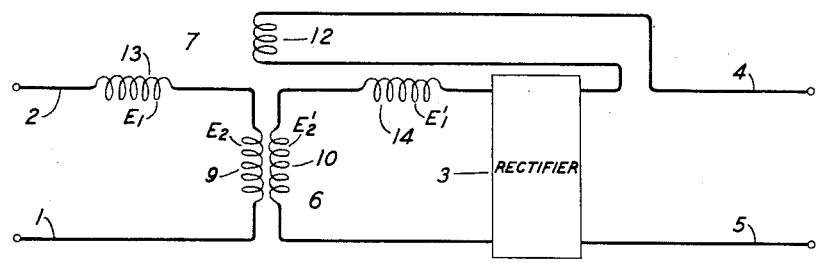
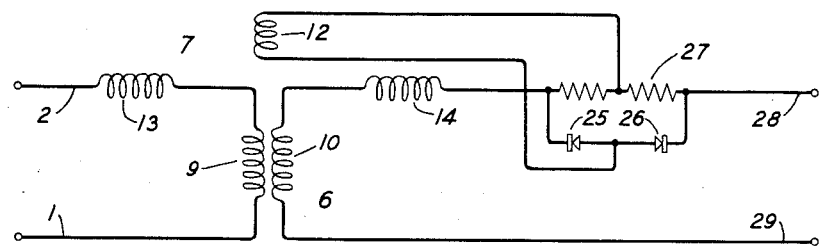
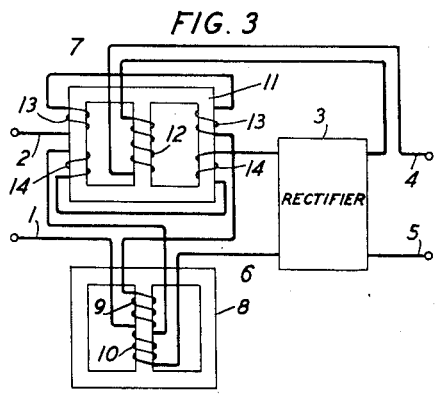
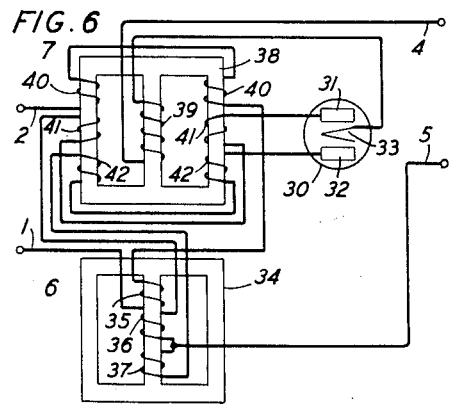
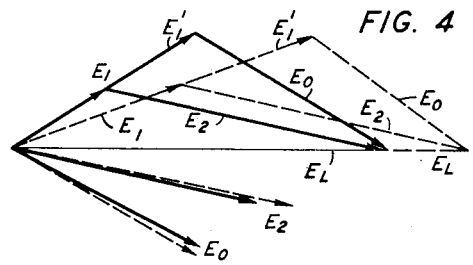
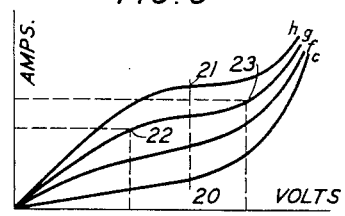
INVENTOR
H. M. STOLLER
BY
Wayne B Wells
ATTORNEY Patented Apr. 2, 1935

1,996,495

UNITED STATES PATENT OFFICE 1,996,495

VOLTAGE REGULATOR

Hugh M. Stoller, Mountain Lakes, N. J., assignor to Bell Telephone Laboratories, Incorporated, New York, N. Y., a corporation of New York Application May 26, 1934, Serial No. 727,667

9 Claims. (Cl. 175—363)

This invention relates to voltage regulators and particularly to voltage regulators controlled by magnetic circuits.

One object of the invention is to provide a voltage regulator that shall maintain the voltage on a load circuit substantially constant by saturated and unsaturated inductive reactors in an improved manner.

Another object of the invention is to provide a voltage regulator controlled by magnetic circuits that shall have improved means for varying the ratio of voltage transformation between the supply circuit and the load circuit.

A further object of the invention is to provide a voltage regulator with a saturated inductive reactor having two inductively related windings respectively in the supply circuit and the load circuit and an unsaturated reactor having two alternating current windings respectively in series with the windings of the saturated reactor and a direct current winding energized in accordance with the load on the load circuit that shall compensate for supply circuit voltage variations and for variations of load on the load circuit.

In a regulated rectifier or in a voltage regulator governed by magnetic circuits, it is desirable in some cases to change the ratio of voltage transformation between the supply circuit and the load circuit without the addition of a transformer to the circuit. According to the present invention, the voltage on a load circuit is maintained constant by means of a saturated inductive reactor and an unsaturated inductive reactor irrespective of supply circuit voltage changes and changes in load on the load circuit. The saturated reactor is provided with two inductively related alternating current windings respectively placed in the supply circuit and the load circuit for controlling the ratio of voltage transformation between the supply circuit and the load circuit.

In a regulated rectifier constructed in accordance with the present invention, an alternating current source supplies current to a rectifier for a load circuit. A saturated inductive reactor and an unsaturated inductive reactor are provided for maintaining the load circuit voltage constant irrespective of the changes in voltage of the source and changes in load on the load circuit.

The saturated inductive reactor comprises a core member carrying two inductively related alternating current windings. The two windings of the saturated reactor are respectively placed in circuit with the alternating current source and in the input circuit for the rectifier. The voltage transformation ratio between the two windings of the saturated reactor is varied to vary the load circuit voltage with respect to the voltage of the source of alternating current.

The unsaturated inductive reactor comprises a three-legged core member having a direct current winding on the central leg and two alternating current windings distributed on the outside core legs. The two alternating current windings of the unsaturated reactor are respectively connected in series circuit relation with the windings of the saturated reactor and serve as retard coils. These two alternating windings of the unsaturated reactor are in series aiding relation so that the fluxes produced by the two windings are in the same direction in the outside legs of the core. The two windings preferably should have approximately the same ratio of turns as the two windings of the saturated reactor. The direct current winding of the unsaturated reactor is connected to the rectifier load circuit so as to be energized according to the load on the load circuit. This direct current winding compensates for changes in load on the load circuit.

In case the voltage on the supply circuit changes, for example, raises a certain amount, then the voltage across the alternating current windings of the reactors is raised. This causes an increase in the current flow through the alternating current windings of the reactors included in the supply circuit and this increase in current must be absorbed by the saturated reactor. The alternating current winding of the unsaturated reactor in series with the winding of the saturated reactor in the rectifier input circuit opposes the voltage of the saturated reactor winding to maintain the load circuit voltage constant. The degree of saturation of the unsaturated reactor is varied by the direct current winding on the unsaturated reactor according to the load on the load circuit to compensate for load circuit variations.

An alternating current voltage regulator may be constructed according to the present invention by dispensing with the load rectifier in the above mentioned regulated rectifier and by providing a small auxiliary rectifier connected across an impedance in the load circuit to energize the direct current winding of the unsaturated reactor. The alternating current voltage regulator operates in the same manner as the above mentioned regulated rectifier.

The present invention is a modification of the invention disclosed in the appplication of H. M. Stoller, Serial No. 655,063, filed February 3, 1933. The improvements for the regulated rectifier which are disclosed in the application of J. R. Power, Serial No. 706,010, filed January 10, 1934 may be used with the present invention.

In the accompanying drawing:

Fig. 1 is a diagrammatic view of a regulated rectifier constructed in accordance with the invention;

Fig. 2 is a diagrammatic view of an alternating current voltage regulator constructed in accordance with the invention;

Fig. 3 is a diagrammatic view of the regulated rectifier showing in more detail the saturated inductive reactor and the unsaturated inductive reactor;

Fig. 4 is a vector diagram showing the relation of the voltages across the reactor windings with respect to the supply circuit voltage and the load circuit voltage;

Fig. 5 is a chart of curves illustrating the operation of the compensating winding on the unsaturated inductive reactor; and Fig. 6 is a diagrammatic view of a full wave regulated rectifier constructed according to the invention.

Referring to Figs. 1 and 3 of the drawing, an alternating current supply circuit comprising conductors 1 and 2 is connected to a rectifier 3 for supplying rectified current to a load circuit comprising conductors 4 and 5. A saturated inductive reactor 6 and an unsaturated inductive reactor 7 are provided between the supply conductors 1 and 2 and the rectifier 3 for compensating not only for voltage changes on the supply conductors but also for load changes on the load circuit so as to maintain substantially constant voltage on the load conductors 4 and 5.

The saturated inductive reactor 6 comprises a core member 8 preferably of the three-legged type having two alternating current windings 9 and 10 mounted on the central core leg. The two alternating current windings 9 and 10 are inductively related and serve as a transformer between the supply conductors 1 and 2 and the input circuit of the rectifier 3. The transformation ratio between the two windings 9 and 10 may be varied to vary the voltage on the load conductors 4 and 5 with respect to the voltage on the supply conductors 1 and 2.

The unsaturated inductive reactor 7 comprises a three-legged core member 11 having a direct current winding 12 mounted on the central core leg and two alternating current windings 13 and 14 mounted on the outside core legs. The two windings 13 and 14 are distributed on the two outside core legs as shown in Fig. 3 of the drawing. The alternating current windings 13 and 14 are respectively connected in series with the two alternating current windings 9 and 10 of the saturated inductive reactor 6. The windings 13 and 14 are connected in aiding relationship so that the flux in the outside core legs produced by one winding is in the same direction as the flux produced by the other winding. The two windings 13 and 14 act as retard coils. The ratio of turns of the two windings 13 and 14 must be approximately the same as the ratio of turns on the two windings 9 and 10 of the saturated inductive reactor 6. The direct current winding 12 on the central core leg of the unsaturated inductive reactor 11 is connected to the load circuit in order to be energized in accordance with the load on the rectifier 3. The degree of saturation of the unsaturated inductive reactor 11 is varied by the winding 12 in order to compensate for variations in load on the rectifier 3.

Referring to Fig. 4 of the drawing a vector diagram is shown for illustrating the relationship of the voltages across the various windings of the reactors. In the vector diagram:

$E_L$ is the supply circuit voltage across conductors 1 and 2

$E_0$ is the load circuit voltage across the input to the rectifier $E_1$ is the voltage across the winding 13

$E_1'$ is the voltage across the winding 14

$E_2$ is the voltage across the winding 9

$E_2'$ is the voltage across the winding 10.

According to Kirchoff's law:

$$E_L = E_1 + E_2 \quad (1)$$

and $$E_2' = E_1' + E_0 \quad (2)$$

$$E_2 = aE_2' \quad (3)$$

where $a$ is the ratio of voltage transformation between the windings 9 and 10.

Combining Equations 1 and 3, we have, $$E_L = E_1 + aE_2' \quad (4)$$

Combining Equations 2 and 4, we have, $$E_L = E_1 + aE_1' + aE_0 \quad (5)$$

$$E_1 = aE_1' \text{ (approximately)} \quad (6)$$

Combining Equations 5 and 6, we have, $$E_L = 2E_1 + aE_0 \quad (7)$$

where the voltage transformation between the windings 9 and 10 is one, we have $$E_L = 2E_1 + E_0 \quad (8)$$

The vector diagram, shown in Fig. 4, is constructed according to Equations 1 and 8, the solid lines indicate the conditions for low input voltage and the dotted lines indicate conditions for high input voltage. A triangle is formed according to Equation 1 with the voltages across the supply circuit and windings 9 and 13. The vector $E_1$ is then doubled and a triangle formed with the supply circuit voltage vector to obtain the load circuit voltage $E_0$. This procedure is followed for both high and low supply circuit voltages. For high input voltage, the vector $E_1$ is increased as also the vectors $E_L$ and $E_2$. However, the increase in the vectors $E_1$ and $E_2$ is only about half the increase in the vector $E_L$. This alters the size and angles of the vector diagram in such manner that $E_0$ remains constant as indicated.

Referring to Fig. 5 of the drawing, curves have been drawn showing the operation of the unsaturated inductive reactor for various loads on the rectifier 3. The curves $e$, $f$, $g$, and $h$ have been drawn with amperes of current flowing through the alternating current winding 13 as ordinates and the voltage across the alternating current winding 13 as abscissa. The curve $e$ is drawn for light load on the rectifier 3 and curve $h$ is drawn for a heavy load on the rectifier. The curves $g$ and $f$ are drawn for two intermediate loads. When the regulated rectifier is operating with constant supply circuit voltage and variable load the operating range would be along the dotted line 20—21 or on a line parallel to it for a different constant supply circuit voltage. When operating on a constant load but with variable supply circuit voltage, the range would be along the line 22—23 on curve $g$ or along a line parallel to it on a different curve for a different load. In the event of simultaneous variations in both load and supply circuit voltages the operating range is the resultant combination. When operating at a constant load with variable supply circuit voltage, as for example, along the line 22—23, it will be noted the curve 22—23 is fairly flat and the increment of current between the point 22 and the point 23 is fairly small. Therefore, the current increase in the windings 13 and 9 of the unsaturated reactor and the saturated reactor is fairly small and accordingly the saturated reactor 6 will not have to absorb an excessive amount of current. Accordingly, the size of the saturated inductive reactor 6 may be reduced when the unsaturated inductive reactor 7 is provided with a three-legged core member of the type shown in Fig. 3 of the drawing. Moreover, a saving in power is effected and the power factor is improved.

If the supply circuit voltage across the conductors 1 and 2 increases, the voltage across the alternating current windings of the unsaturated reactor and the saturated reactor increase at the same time. The current flow through the winding 13 of the unsaturated reactor and the current flow through the winding 9 of the saturated reactor increases. This increase in current, however, is absorbed by the exciting current of the saturated reactor and the increased voltage across the winding 14 which opposes the voltage of the saturated reactor winding 10 equals the increase in voltage across the winding 10 so as to supply constant voltage to the rectifier 3. A similar operation takes place in case the voltage across the supply conductors falls below normal value. The direct current winding 12 varies the saturation of the unsaturated reactor 7 according to the load on the load circuit to compensate for variations in load.

Referring to Fig. 2 of the drawing, an alternating current voltage regulator is shown constructed in accordance with the invention. The voltage regulator shown in Fig. 2 of the drawing is very similar to the regulated rectifier shown in Fig. 1 of the drawing and like parts have been indicated by similar reference characters. In the voltage regulator shown in Fig. 2, a saturated inductive reactor 6 is provided having alternating current windings 9 and 10 and an unsaturated inductive reactor is provided having a direct current winding 12 and two alternating current windings 13 and 14. No load rectifier is provided in the circuit of Fig. 2 but two small copper oxide rectifiers 25 and 26 are connected across an impedance 27 in the load circuit for supplying direct current to the direct current winding 12 which varies in accordance with the alternating current load on the load conductors 28 and 29. The inductive reactors 6 and 7 in Fig. 2 are provided with core members similar to the core members 8 and 11 shown in Fig. 3 of the drawing. The voltage regulator shown in Fig. 2 of the drawing operates in a manner exactly similar to the operation of the regulator shown in Fig. 1 of the drawing.

Referring to Fig. 6 of the drawing a full wave regulated rectifier is shown constructed in accordance with the invention. A full wave rectifier 30 having two anodes 31 and 32 and a cathode 33 is connected to the input conductors 1 and 2 by the saturated inductive reactor 6 and the unsaturated inductive reactor 7 for supplying rectified current to the load conductors 4 and 5.

The saturated inductive reactor 6 comprises a three-legged core member 34 having three windings 35, 36 and 37 mounted on the central core leg. The unsaturated inductive reactor 7 comprises a three-legged core member 38 having a direct current winding 39 mounted on the central core leg and three alternating current windings 40, 41 and 42 mounted on the outside core legs.

The alternating current windings 35 and 42 on the saturated and unsaturated reactors correspond to the windings 9 and 13 shown in Fig. 1 of the drawing. The alternating current windings 36 and 37 on the saturated reactor 6 are connected in series and correspond to the winding 10 shown in Fig. 1 of the drawing. The winding 35 is in inductive relation to the windings 36 and 37. The alternating current winding 41 on the unsaturated reactor is connected in series with the winding 36 to the anode 31 and the alternating current winding 40 of the unsaturated inductive reactor 7 is connected in series with the winding 37 to the anode 32. The common terminal of the windings 36 and 37 is connected to the load conductor 5. The direct current winding 39 of the reactor 7 is connected in series with the load circuit.

The full wave regulated rectifier shown in Fig. 6 of the drawing operates in the same manner as the regulated rectifier shown in Figs. 1 and 3 of the drawing. A divided secondary winding or two secondary windings on the saturated inductive reactor are required for connection to the full wave rectifier. Windings are required on the unsaturated inductive reactor corresponding to the secondary windings on the saturated inductive reactor.

Modifications in the circuits and in the arrangement and location of the parts may be made within the spirit and scope of the invention and such modifications are intended to be covered by the appended claims.

What is claimed is:

1. In a voltage regulator between an alternating current supply circuit and an auxiliary circuit, a saturated inductive reactor having two inductively related alternating current windings respectively connected in the supply circuit and in the auxiliary circuit, an unsaturated inductive reactor having two alternating current windings respectively connected in series with the two windings of said saturated reactor, a direct current winding and means for energizing said direct current winding with direct current according to the load on the auxiliary circuit.

2. In a voltage regulator between an alternating current supply circuit and an auxiliary circuit, a saturated reactor having two inductively related alternating current windings respectively connected in the supply circuit and in the auxiliary circuit and effecting any desired ratio of voltage transformation, an unsaturated reactor having two alternating current windings respectively connected in series with the two windings of said saturated reactor, the two alternating current windings of the unsaturated reactor having substantially the same voltage transformation ratio as the two alternating current windings on the saturated reactor, a direct current winding on said unsaturated reactor, and means for energizing said direct current winding with direct current according to the load on the auxiliary circuit.

3. In a voltage regulator between an alternating current supply circuit and an auxiliary circuit, an inductive reactor having a saturated core carrying two inductively related alternating current windings respectively connected in the supply circuit and in the auxiliary circuit, an inductive reactor having an unsaturated three-legged core member carrying two alternating current windings distributed on the outside legs and a direct current winding on the central leg, the alternating current windings of the unsaturated reactor being respectively connected in series with the alternating current windings of the saturated reactor, and means for energizing said direct current winding with direct current according to the load on the auxiliary circuit.

4. In a voltage regulator between an alternating current supply circuit and an auxiliary circuit, an inductive reactor having a saturated core carrying two inductively related alternating current windings respectively connected in the supply circuit and in the auxiliary circuit, said windings of the saturated reactor effecting any desired voltage transformation ratio, an inductive reactor having an unsaturated three-legged core member carrying two alternating current windings distributed on the outside core legs and a direct current winding on the central leg of the core, the alternating current windings of the unsaturated reactor being respectively connected in series with the alternating current windings of the saturated reactor and having substantially the same voltage transformation ratio as the two alternating current windings of the saturated reactor, and means for energizing said direct current winding with direct current according to the load on the auxiliary circuit.

5. In combination, an alternating current supply circuit, a rectifier for supplying rectified current to a load circuit, a saturated inductive reactor having two inductively related windings respectively connected in the supply circuit and in circuit with said rectifier, an unsaturated reactor having two alternating current windings respectively in circuit with the two windings of said saturated reactor and a direct current winding, and means for energizing said direct current winding from the load circuit to compensate for variation in load.

6. In a voltage regulator, an alternating current supply circuit, a rectifier having an input circuit adapted to be connected to said supply circuit and supplying rectified current to a load circuit, a saturated reactor having two inductively related windings respectively connected in said supply circuit and in the input circuit of said rectifier, an unsaturated reactor having two alternating current windings respectively connected in series circuit with the alternating current windings of said saturated reactor and the two alternating windings in the rectifier input circuit opposing each other, a direct current winding on said unsaturated reactor, and means for energizing said direct current winding from the load circuit to compensate for load circuit variations.

7. In a voltage regulator, an alternating current supply circuit, a rectifier for supplying current to a load circuit, a saturated reactor having two inductively related alternating current windings respectively connected in the supply circuit and in the input circuit of the rectifier, said windings on the saturated reactor effecting any desired voltage transformation ratio, an unsaturated reactor having two alternating current windings respectively connected in series with the two alternating current windings of the saturated reactor, the two alternating current windings of the unsaturated reactor having substantially the same voltage transformation ratio as the two alternating current windings on the saturated reactor, and means for energizing said direct current winding according to the load on said rectifier.

8. In a voltage regulator, an alternating current supply circuit, a rectifier for supplying current to a load circuit, an inductive reactor having a saturated core carrying two inductively related alternating current windings respectively connected in the supply circuit and in the input circuit of the rectifier, an inductive reactor having an unsaturated three-legged core carrying two alternating current windings on the outside core legs and a direct current winding on the central leg, the alternating current windings of the unsaturated reactor being respectively connected in series with the alternating current windings of the saturated reactor, and means for energizing the direct current winding of the unsaturated reactor according to the load on the rectifier.

9. In a voltage regulator, an alternating current supply circuit, a rectifier for supplying current to a load circuit, a saturated reactor having two inductively related alternating current windings respectively connected in the supply circuit and in the input circuit of the rectifier, said windings on the saturated reactor effecting any desired voltage transformation ratio, an inductive reactor having an unsaturated three-legged core carrying two alternating current windings on the outside core legs and a direct current winding on the central core leg, the alternating current windings of the unsaturated reactor being respectively connected in series with the alternating current windings of the saturated reactor and having substantially the same voltage transformation ratio as the windings of the saturated reactor, and means for energizing the direct current winding of the unsaturated reactor according to the load on the rectifier.

HUGH M. STOLLER.